No. 728,763. PATENTED MAY 19, 1903.
J. F. W. RITSCH.
LUMBER RULE.
APPLICATION FILED FEB. 12, 1903.
NO MODEL.

Witnesses

J. F. W. Ritsch, Inventor.
by C. A. Snow & Co.
Attorneys

No. 728,763. Patented May 19, 1903.

UNITED STATES PATENT OFFICE.

JOHN F. W. RITSCH, OF FAIRCHILD, WISCONSIN.

LUMBER-RULE.

SPECIFICATION forming part of Letters Patent No. 728,763, dated May 19, 1903.

Application filed February 12, 1903. Serial No. 143,097. (No model.)

*To all whom it may concern:*

Be it known that I, JOHN F. W. RITSCH, a citizen of the United States, residing at Fairchild, in the county of Eau Claire and State of Wisconsin, have invented a new and useful Lumber-Rule, of which the following is a specification.

My invention relates to lumber-rules, and has for its objects to produce a device of this character which will be simple of construction, efficient in operation, and one which may be readily manipulated for the purpose of measuring or gaging lumber.

To these ends the invention comprises the combination, with a casing, of a graduated member slidable therein and adapted to be moved outward for engaging the lumber and means for automatically returning the member to its casing.

The invention further comprises the details of construction and combination of parts more fully hereinafter described.

Figure 1:
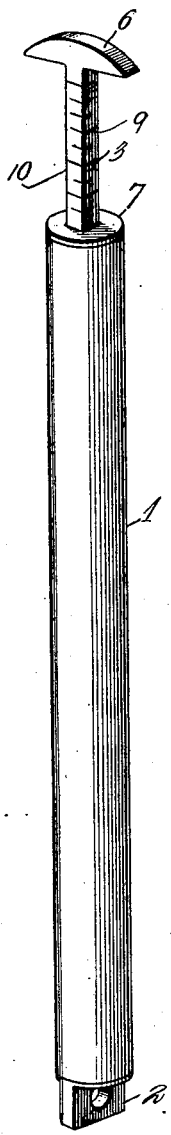
Figure 2:
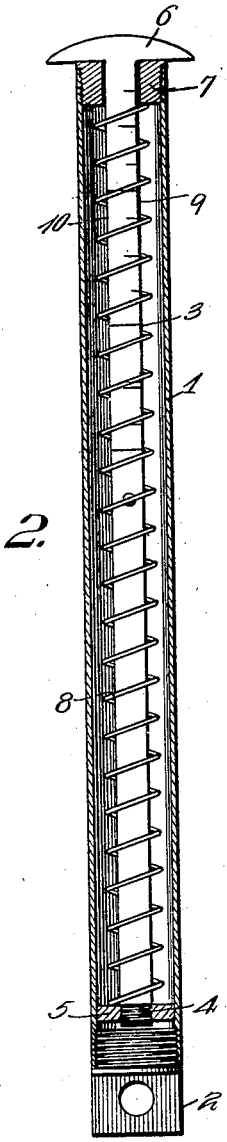

In the accompanying drawings, Figure 1 is a perspective view of the device, showing the slidable member in its extended position. Fig. 2 is a longitudinal sectional elevation through the same.

Referring to the drawings, 1 indicates a casing, preferably in the form of a cylindrical metal tube of any desired length and having one of its ends closed by a screw-threaded cap 2, tapped therein.

Mounted within the casing is a slidable member 3, preferably in the form of an angular rod of metal or other suitable material. This rod is screw-threaded at its inner end, as at 4, to receive an annular disk 5 of a size to fit snugly against the inner wall of the casing and has formed on its outer end a head 6, which lies transversely across the end of the member and projects beyond the same to form two lateral fingers, which on their inner sides are flat and lie at right angles to the lateral faces of the member, the outer face of this head being curved from end to end, whereby the ends of the lateral fingers are rendered sharp for readily engaging between two boards.

7 indicates a screw-threaded plug tapped into the other end of the casing to close the same and provided with a central perforation, in which the member 3 slides. Mounted on the rod between the disk 5 and plug 7 is a spring 8, which is normally expanded and is adapted when the member is drawn outward from its casing during the operation of gaging the lumber to be compressed between the disk 5 and plug 7 and when the member is released to again expand, thus automatically returning the member again to its casing. The member has two of its faces 9 and 10 suitably graduated to indicate inches and fractions of inches, though the drawings show but one of these graduated faces.

In operation in order to gage or measure a piece of lumber it is merely necessary to engage one of the ends of the head over the edge of the lumber and draw the slidable member out of its casing until the end of the casing can be moved into engagement with the other edge of the lumber, thus obtaining a correct measurement of the same, which will be clearly indicated by the graduations on the member and may be readily read therefrom. This operation of measuring the lumber compresses the spring, as before stated, and when the head of the member is released from the lumber the spring will automatically return the member to its casing.

From the foregoing it will be seen that I produce a device which is at once simple and efficient, may be conveniently carried in the pocket, and readily manipulated for gaging or measuring lumber or the like, and in attaining these ends I do not limit or confine myself to the precise details herein shown, as various changes may be made without departing from the spirit or scope of my invention.

Having thus described my invention, what I claim is—

1. In a lumber-rule, the combination with a casing, of a rod slidably mounted therein and provided with linear graduations, a head formed on the rod for engaging the lumber to withdraw the rod, and a spring for automatically returning the rod to its casing.

2. In a lumber-rule, the combination with a casing, of a graduated rod slidingly mounted therein, a head formed on the rod and projecting beyond the casing transversely for engaging the lumber to withdraw the rod, and a spring for automatically returning the rod to its casing.

In testimony that I claim the foregoing as my own I have hereto affixed my signature in the presence of two witnesses.

JOHN F. W. RITSCH.

Witnesses:
WM. F. HOOD,
HATTIE M. FOSS.